United States Patent
Itazu et al.

(10) Patent No.: US 8,538,642 B2
(45) Date of Patent: Sep. 17, 2013

(54) RANGE DETERMINATION APPARATUS

(75) Inventors: Naoki Itazu, Nagoya (JP); Yoshinobu Nozaki, Anjo (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 204 days.

(21) Appl. No.: 13/119,603

(22) PCT Filed: Sep. 4, 2009

(86) PCT No.: PCT/JP2009/004375
§ 371 (c)(1),
(2), (4) Date: Mar. 17, 2011

(87) PCT Pub. No.: WO2010/041372
PCT Pub. Date: Apr. 15, 2010

(65) Prior Publication Data
US 2011/0190994 A1    Aug. 4, 2011

(30) Foreign Application Priority Data

Oct. 10, 2008  (JP) ................................. 2008-264224

(51) Int. Cl.
*G06F 7/00* (2006.01)
(52) U.S. Cl.
USPC ........... 701/51; 192/3.51; 192/3.52; 192/225; 192/12 R; 192/48.4; 475/69; 475/86; 701/67; 701/95; 701/55

(58) Field of Classification Search
None
See application file for complete search history.

(56) References Cited

U.S. PATENT DOCUMENTS

| | | | | |
|---|---|---|---|---|
| 5,166,879 A | * | 11/1992 | Greene et al. | 701/62 |
| 5,191,527 A | * | 3/1993 | Asahara et al. | 701/60 |
| 5,445,579 A | * | 8/1995 | Fujita et al. | 477/156 |
| 5,921,885 A | * | 7/1999 | Tabata et al. | 477/107 |
| 6,101,440 A | * | 8/2000 | Wagner et al. | 701/67 |
| 6,357,289 B1 | * | 3/2002 | Futawatari | 73/115.02 |
| 7,264,573 B2 | * | 9/2007 | Takagi | 477/156 |
| 7,402,123 B2 | * | 7/2008 | Kobayashi et al. | 477/75 |

(Continued)

FOREIGN PATENT DOCUMENTS

| | | |
|---|---|---|
| JP | 2001 59570 | 3/2001 |
| JP | 2002 533631 | 10/2002 |

OTHER PUBLICATIONS

International Search Report Issued Oct. 27, 2009 in PCT/JP09/004375 filed Sep. 4, 2009.

*Primary Examiner* — Thomas Tarcza
*Assistant Examiner* — Richard Goldman
(74) *Attorney, Agent, or Firm* — Oblon, Spivak, McClelland, Maier & Neustadt, L.L.P.

(57) ABSTRACT

A range determination apparatus for preventing a shift range from being undefined during speed change states of an automatic transmission with no manual valve. The range determination apparatus includes a gear speed change mechanism and a plurality of friction engagement elements operative to have respective operation states changed between an engagement and a disengagement state. The range determination apparatus is used for automatic transmissions subject to speed changes via a torque transmission path of the gear speed change mechanism changed by the operation states of the friction engagement elements. A real shift range determination is carried out on the basis of the operation states of the friction engagement elements, where a T-ECU is operative to determine a current shift range based on detection results obtained by oil pressure sensors and operation patterns preliminarily memorized when the operation states of the friction engagement elements are not being changed.

6 Claims, 11 Drawing Sheets

(56) References Cited

U.S. PATENT DOCUMENTS

| | | | |
|---|---|---|---|
| 7,481,734 B2* | 1/2009 | Morise et al. | 475/119 |
| 7,862,472 B2* | 1/2011 | Kawaguchi et al. | 477/97 |
| 7,980,981 B2* | 7/2011 | Kawaguchi et al. | 475/116 |
| 2004/0122577 A1* | 6/2004 | Ford et al. | 701/58 |
| 2007/0213175 A1* | 9/2007 | Kuwahara et al. | 477/62 |
| 2008/0004159 A1* | 1/2008 | Kubonoya et al. | 477/115 |
| 2008/0119323 A1* | 5/2008 | Kitaori | 477/97 |
| 2010/0262346 A1* | 10/2010 | Matsunaga et al. | 701/68 |
| 2012/0065854 A1* | 3/2012 | Stoller et al. | 701/60 |

* cited by examiner

FIG.6

|  | C1 | C2 | C3 | C4 | B1 | B2 | F1 |
|---|---|---|---|---|---|---|---|
| P | × | × | × | × | × | × | × |
| R | × | × | × | ○ | × | ○ | × |
| N | × | × | × | × | × | × | × |
| 1st | ○ | × | × | × | × | ◎ | △ |
| 2nd | ○ | × | × | × | ○ | × | × |
| 3rd | ○ | × | ○ | × | × | × | × |
| 4th | ○ | × | × | ○ | × | × | × |
| 5th | ○ | ○ | × | × | × | × | × |
| 6th | × | ○ | × | ○ | × | × | × |
| 7th | × | ○ | ○ | × | × | × | × |
| 8th | × | ○ | × | × | ○ | × | × |

○ ENGAGEMENT STATE
× DISENGAGEMENT STATE
◎ ENGAGEMENT STATE WHEN ENGINE BRAKE IS FUNCTIONING
△ ENGAGEMENT STATE ONLY WHEN DRIVING POWER IS GENERATED

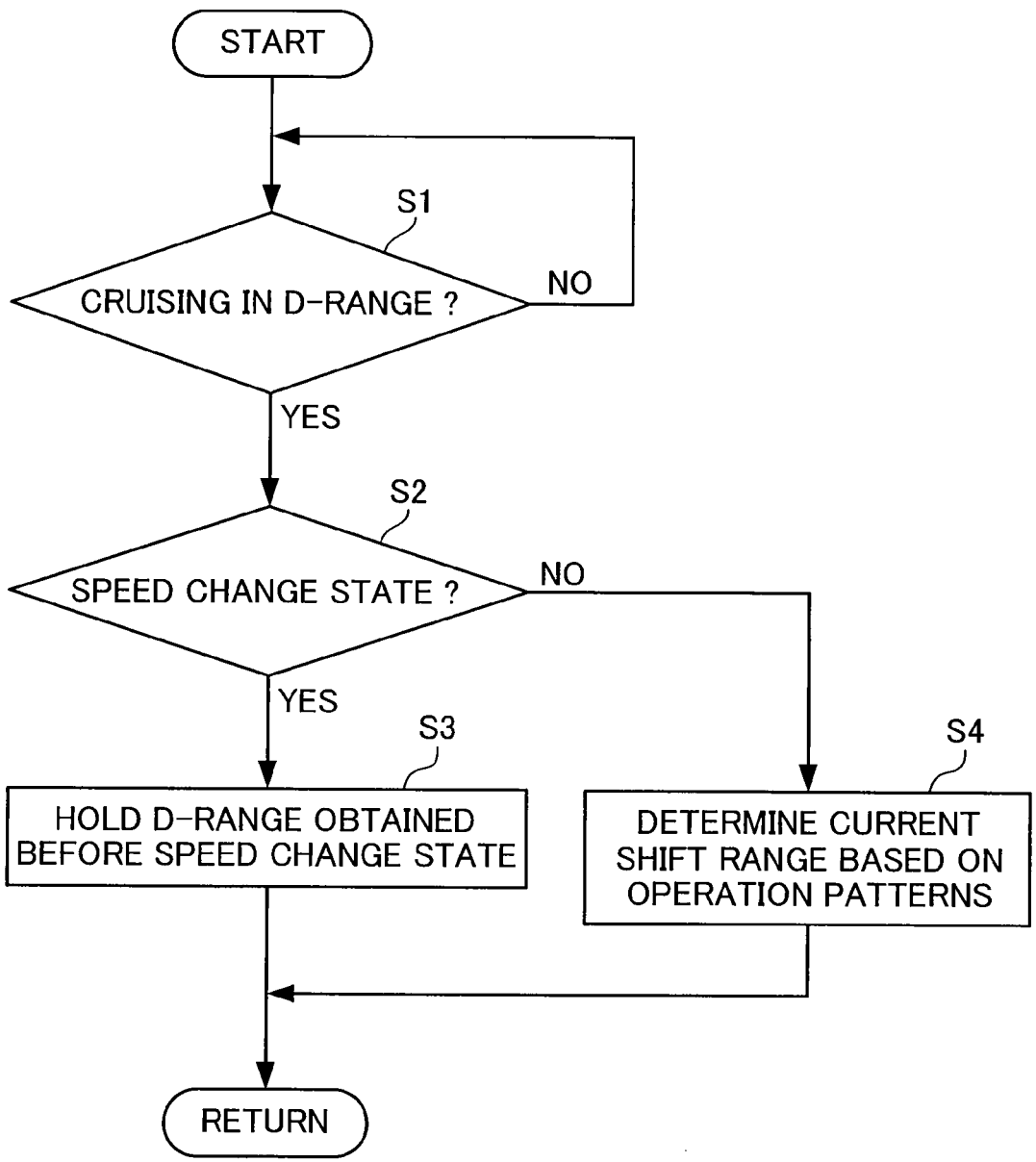

FIG.9A

| | C1 | C2 | C4 | B2 | P-SENSOR |
|---|---|---|---|---|---|
| P | × | × | × | × | ○ |
| R | × | × | ○ | ○ | × |
| N | × | × | × | × | × |
| D 1st~3rd | ○ | × | × | × | × |
| D 1st E/B | ○ | × | × | ○ | × |
| D 4th | ○ | × | ○ | × | × |
| D 5th | ○ | ○ | × | × | × |
| D 6th | × | ○ | ○ | × | × |
| D 7th~8th | × | ○ | × | × | × |

FIG.9B

| | C1 | C2 | C4 | B2 | P-SENSOR |
|---|---|---|---|---|---|
| 4th | ○ | × | ○ | × | × |
| SPEED CHANGE STATE | × | × | ○ | × | × |
| 6th | × | ○ | ○ | × | × |

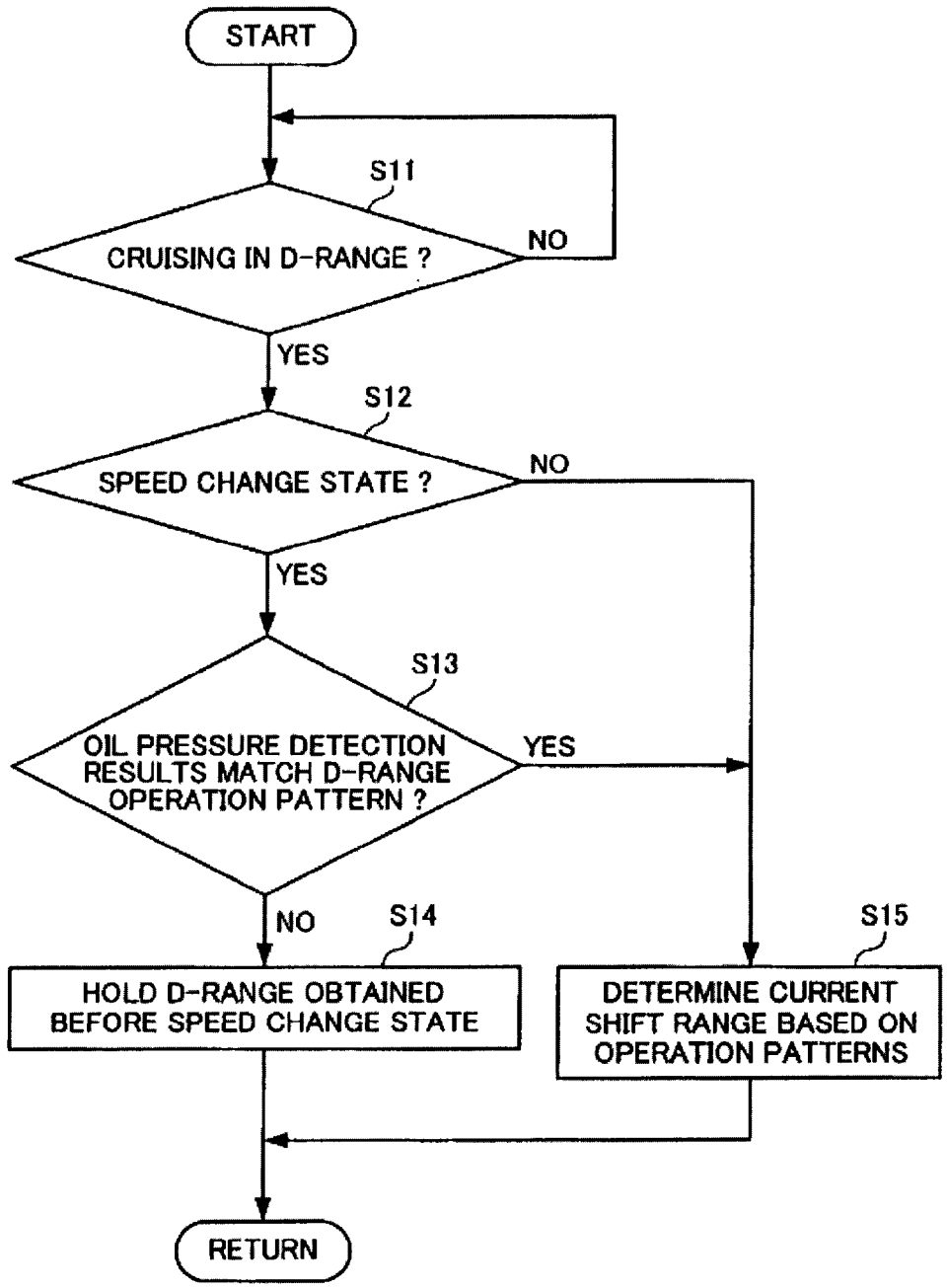

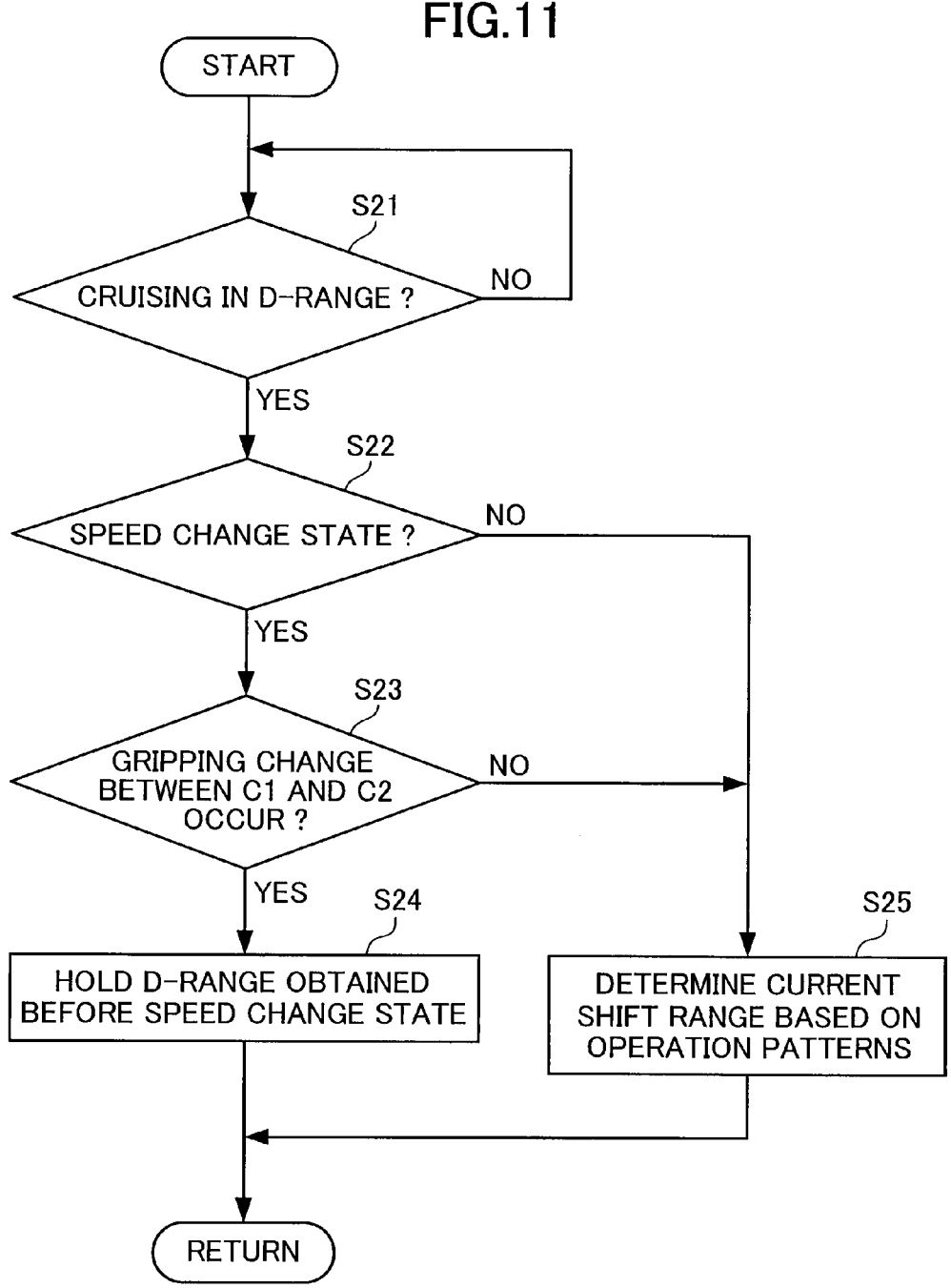

RANGE DETERMINATION APPARATUS

TECHNICAL FIELD

The present invention relates to a range determination apparatus for determining a shift range assembled in an automatic transmission mounted on an automotive vehicle.

BACKGROUND ART

A conventional automatic transmission mounted on an automotive vehicle comprises a transmission mechanism having a drive force from an engine transmitted thereto through a torque converter. The transmission mechanism has a plurality of clutches and brakes each serving as a friction engagement element, and a plurality of gears constituting power transmission paths selectively changed in response to the selective engagement and disengagement of the clutches and brakes to form a desired speed change stage.

The clutches and the brakes are changed into either one of their engagement states and disengagement states from the other of their engagement states and disengagement states with an oil pressure circuit changed in its states by solenoids and manual valves forming part of the oil pressure control circuit, thereby making it possible to establish a plurality of forward movement speed change stages and a rearward movement speed change stage in response to the operation position of a shift lever.

The manual valve is constituted to be mechanically changed in its states in response to the operation positions of the shift lever, while an oil pump driven by the engine is operative to produce a line pressure to be supplied to each of the oil pressure circuits.

In the recent years, there has been proposed a shift-by-wire type of control system, which is electrically controlled by the shift lever in response to the operation positions of the shift lever. With the shift-by-wire type of control system emerging as above, there has also been developed an automatic transmission with no manual valve as disclosed by the Japanese Publication No. 2002-533631 (Patent Publication No. 1).

The conventional automatic transmission as disclosed by the Japanese Publication No. 2002-533631 is operated with an electromagnetic valve logic that is based to selectively operate either one of the solenoid valves, due to the fact that the automatic transmission is equipped with no manual valve. This means that either one of solenoid valves is selected to be operated to establish the rearward movement speed change stage or the desired forward movement speed change stage. The conventional automatic transmission as disclosed by the Japanese Publication No. 2002-533631 is thus operated with the selected solenoid valves to operate the brakes and the clutches selected on the basis of a clutch logic so that the rearward movement speed change stage or the desired forward movement speed change stage can be established.

Here, the automatic transmission realized to change the shift range with the shift-by-wire type of control system comprises shift position sensors corresponding to the operation positions of the shift lever, the shift position sensors being operative to output information indicative of the detection results based to have the transmission control apparatus (hereinafter simply referred to as "T-ECU") control each of the solenoid valves.

Here, the T-ECU is necessary to hold information indicative of either one of the shift ranges actually selected from among the shift ranges for determining the failure of the automatic transmission.

CITATION LIST

Patent Literature

{PTL 1} Japanese Patent Laying-Open Publication No. 2002-533631

SUMMARY OF INVENTION

Technical Problem

The conventional automatic transmission as disclosed by the Japanese Publication No. 2002-533631 is, however, not considered to an aspect related to the T-ECU determining whether or not the automatic transmission is actually in its current shift range. Therefore, the conventional automatic transmission encountered such a problem that the T-ECU cannot determine whether or not the automatic transmission is actually in its current shift range.

For example, the automatic transmission having a manual valve is considered to determine the shift range based on the detection results of the position sensors for detecting the operation positions of the shift lever; however, the conventional automatic transmission as disclosed by the Japanese Publication No. 2002-533631 is not considered to an aspect related to the T-ECU determining whether or not the automatic transmission is actually in its current shift range in addition to no manual valve provided therein.

Further, the conventional automatic transmission as disclosed by the Japanese Publication No. 2002-533631 is considered to comprise oil pressure sensors respectively detecting oil pressures supplied to the brakes and the clutches, and oil pressure sensors detecting oil pressures supplied to solenoids serving to operate the clutches and the brakes so that the actual shift range is determined based on the detection results of the above oil pressure sensors and the preliminarily memorized operation patterns respectively indicative of the operation states of the friction engagement elements. However, the D-range (drive range) for example tends to cause a combination of operation patterns not memorized in the memory depending upon the timing of changing the operations of the clutches and the brakes especially in the changing states of the friction engagement elements. This possibly results in such a problem that the current shift range becomes undefined.

In particular, the recent automatic transmission has many speed change stages, which means that the recent automatic transmission is operated with the engagement states and the disengagement states of the clutches and the brakes frequently changed, thereby possibly causing the shift range to become undefined.

The present invention has been made in view of the previously mentioned conventional problems. It is, therefore, an object of the present invention to provide a range determination apparatus that can prevent the shift range from becoming undefined in the speed change state even for an automatic transmission with no manual valve.

Solution to Problem

According to one aspect of the present invention to achieve the above object, there is provided a range determination apparatus, comprising a gear speed change mechanism having a plurality of planetary gears each transmitting an output torque of a drive source, and a plurality of friction engagement elements operative to have respective operation states changed between an engagement state and a disengagement state, and used for an automatic transmission realizing speed changes with a torque transmission path of the gear speed change mechanism changed by the operation states of the friction engagement elements, and a real shift range determination being carried out on the basis of the operation states of the friction engagement elements; oil pressure control means for controlling oil pressure capable of changing the operation states of the friction engagement elements; a plurality of oil pressure detection means for detecting the oil pressures controlled by the oil pressure control means; memory means for memorizing operation patterns respectively indicative of the operation states of the friction engagement elements; speed change determination means for determining whether or not the automatic transmission is in a speed change state where the operation states of the friction engagement elements are each being changed by the oil pressure control means; and shift range determination means for determining a current shift range based on the operation patterns memorized in the memory means and the oil pressure detection results detected by the oil pressure detection means when the automatic transmission is judged by the speed change determination means as being not in the speed change state where the operation states of the friction engagement elements are each being changed.

In accordance with this aspect, the range determination apparatus can precisely determine the current shift range due to the fact that the current shift range is determined based on the operation patterns and the oil pressure detection results detected by the oil pressure detection means when the operation states of the friction engagement elements are each determined as not being changed in a speed change state. Additionally, the range determination apparatus can prevent the shift range from becoming undefined even when the oil pressure detection results do not coincide with the operation patterns, due to the fact that the shift range is determined without based on the operation patterns when the operation states of the friction engagement elements are each determined as being changed, that is, within a speed change state. Therefore, the range determination apparatus can prevent the shift range from becoming undefined in the changing states of the friction engagement elements even for an automatic transmission with no manual valve.

It is preferable that the shift range determination means determines the determination results obtained prior to the speed change state as the current shift range when the automatic transmission is judged by the speed change determination means as being in a speed change state in which the operation states of the friction engagement elements are each being changed.

In accordance with this aspect, the range determination apparatus can prevent the shift range from becoming undefined resulting from the fact that the range determination apparatus can determine the current shift range, by using the determination results obtained before the operation states of the friction engagement elements are each determined as being changed, that is, the determination results obtained before the preceding speed change state, under the condition that the automatic transmission is in the speed change state without executing the shift change.

It is preferable that the range determination apparatus further comprises match determination means for determining whether or not the oil pressure detection results obtained by the oil pressure detection means matches either one of the operation patterns memorized in the memory means when the automatic transmission is judged by the speed change determination means as being in a speed change state in which the operation states of the friction engagement elements are each being changed, the shift range determination means determining the current shift range based on the oil pressure detection results and the operation patterns memorized in the memory means when the oil pressure detection results obtained by the oil pressure detection means is determined as matching either one of the operation patterns memorized in the memory means by the match determination means, while the shift range determination means determining the determination results obtained prior to the speed change state as the current shift range when the oil pressure detection results obtained by the oil pressure detection means is determined as not matching either one of the operation patterns memorized in the memory means by the match determination means.

In accordance with this aspect, the range determination apparatus can determine the current shift range based on the operation patterns stored in the memory means and the oil pressure detection results detected by the oil pressure detection means under the condition that the match determination means determines that the oil pressure detection results detected by the oil pressure detection means match either one of the operation patterns even when the operation states of the friction engagement elements are each determined as being changed, that is, in a speed change state. This makes it possible for the range determination apparatus to precisely determine the current shift range due to the fact that the current shift range is determined based on the operation patterns. Additionally, the range determination apparatus can prevent the shift range from becoming undefined even when the oil pressure detection results detected by the oil pressure detection means do not coincide with the operation patterns stored in the memory means, due to the fact that the range determination apparatus can determine the drive range (also referred to as "the determination results") obtained prior to the speed change state as the current shift range when the operation states of the friction engagement elements are each determined as being changed, that is, in a speed change state.

It is preferable that the memory means preliminarily memorizes the speed change states in which a combination of the operation states not matched with the operation patterns memorized in the memory can be caused when the friction engagement elements are operated to have respective operation states changed into either one of the engagement state and the disengagement state. The speed change determination means determines whether or not the current speed change state is corresponding to the speed change state in which a combination of the operation states not matched with the operation patterns memorized in the memory can be caused when the friction engagement elements are operated to have respective operation states changed into either one of the engagement state and the disengagement state. Further, the shift range determination means determines the current shift range based on the oil pressure detection results and the operation patterns memorized in the memory means when the current speed change state is determined by the speed change determination means as not being corresponding to the speed change state in which a combination of the operation states not matched with the operation patterns memorized in the memory can be caused. Additionally, the shift range determination means determining the determination results obtained prior to the speed change state as the current shift range when the current speed change state is determined by the speed change determination means as being corresponding to the speed change state in which a combination of the operation states not matched with the operation patterns memorized in the memory can be caused.

In accordance with this aspect, the range determination apparatus can determine the current shift range based on the operation patterns and the oil pressure detection results detected by the oil pressure detection means under the condition that the speed change determination means determines that the speed change states do not correspond to the speed change states which can be caused a combination of the operation states not matched with the operation patterns. This makes it possible for the range determination apparatus to precisely determine the current shift range even in the speed change states. Additionally, the range determination apparatus can determine the determination results obtained prior to the speed change state as the current shift range under the condition that the speed change determination means determines that the speed change state matches either one of the speed change states which can cause the shift range as "undefined". This makes it possible for the range determination apparatus to prevent the shift range from becoming undefined in the speed change state.

Advantageous Effects of Invention

The present invention can provide a range determination apparatus capable of preventing the shift range from becoming undefined in the speed change state even for an automatic transmission with no manual valve.

BRIEF DESCRIPTION OF DRAWINGS

FIG. 6 is an engagement table showing operation states of respective clutches and brakes assembled in the speed change mechanism portion according to the first embodiment of the present invention.

FIG. 8 is a flow chart showing the operation of a T-ECU according to the first embodiment of the present invention.

FIG. 9A is a view showing operation patterns of the friction engagement elements respectively indicative of the operation states of the friction engagement elements detected by oil pressure sensors and parking sensors according to the first embodiment of the present invention.

FIG. 9B is a view explaining the operation states of the friction engagement elements in the changing states from the 4-speed stage to the 6-speed stage among the operation states of the friction engagement elements detected by the oil pressure sensors and the parking sensors according to the first embodiment of the present invention.

FIG. 10 is a flow chart showing the operation of a T-ECU according to the second embodiment of the present invention.

FIG. 11 is a flow chart showing the operation of a T-ECU according to the third embodiment of the present invention.

DESCRIPTION OF EMBODIMENTS

The embodiments of the present invention will be described hereinafter with reference to the accompanying drawings.

First Embodiment

Figure 1:
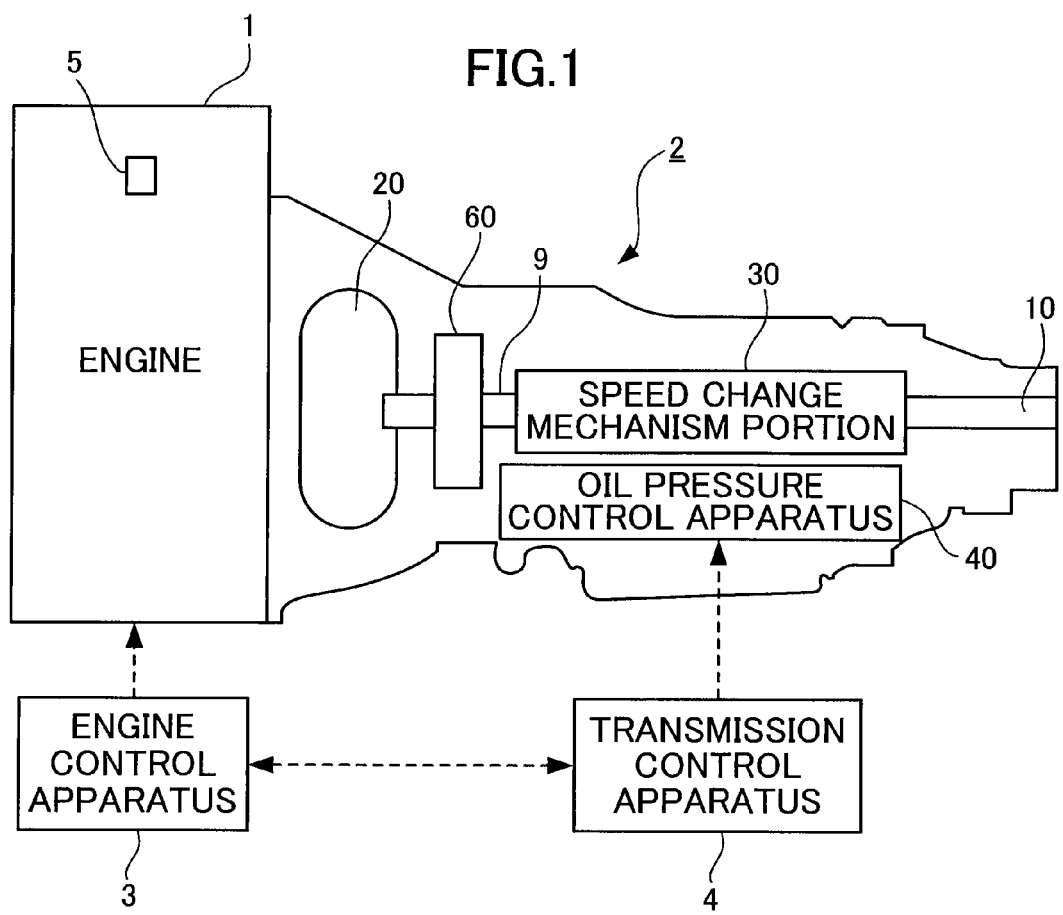
FIG. 1 is an outlined construction view of a power train mounted on an automotive vehicle according to the first embodiment of the present invention.

FIG. 1 is an outlined construction view of a power train mounted on an automotive vehicle according to the first embodiment of the present invention.

The construction of the power train will firstly be explained. As shown in FIG. 1, the power train to be mounted on the automotive vehicle mainly comprises an engine 1 as a drive source, an automatic transmission 2 for realizing a speed change, an engine control apparatus 3, and a transmission control apparatus 4.

The engine 1 is designed to generate a rotation power by burning an air-fuel mixture mixed at a suitable ratio of air introduced from the exterior and fuel injected by a fuel injection valve 5. The fuel injection valve 5 is controlled by the engine control apparatus 3.

The automatic transmission 2 mainly comprises a torque converter 20, a speed change mechanism portion 30, an oil pressure control apparatus 40, and an oil pump 60, and is capable of changing speed including eight forward movement stages and one rearward movement stage.

The speed change mechanism portion 30 comprises a gear speed change mechanism having a plurality of planetary gears each transmitting an output torque from the engine 1, and a plurality of friction engagement elements which will be described hereinafter but is operative to have operation states changeable between an engagement state and a disengagement state so that the plurality of friction engagement elements can allow the torque transmission paths of the gear speed change mechanism to be changed. This change of the torque transmission paths results in the fact that the rotation power inputted from the torque converter 20 through the input shaft 9 is adapted to be changed in speed and outputted from the output shaft 10. The oil pressure control apparatus 40 is designed to control the speed change operation of the speed change mechanism portion 30.

Each of the engine control apparatus 3 and the transmission control apparatus 4 is a generally known ECU (Electronic Control Unit), and hardware designs of these ECUs are roughly the same with each other. The engine control apparatus 3 is adapted to control the engine 1, while the transmission control apparatus 4 is adapted to control the oil pressure control apparatus 40 so that the control of the oil pressure control apparatus 40 can allow the desired speed change stage, i.e., the power transmission paths to be established.

The transmission control apparatus (hereinafter simply referred to as T-ECU again) 4 is electrically connected with the engine control apparatus 3 so that the T-ECU 4 can transmit and receive the signal of the engine control apparatus 3, which makes it possible for the T-ECU 4 to obtain various kinds of information relative to the engine control from the engine control apparatus 3. Here, the T-ECU 4 in the present embodiment constitutes a range determination apparatus defined in the present invention, and can be applied to the automatic transmission 2. The particular construction of the T-ECU 4 will become apparent as the description proceeds.

Figure 2:
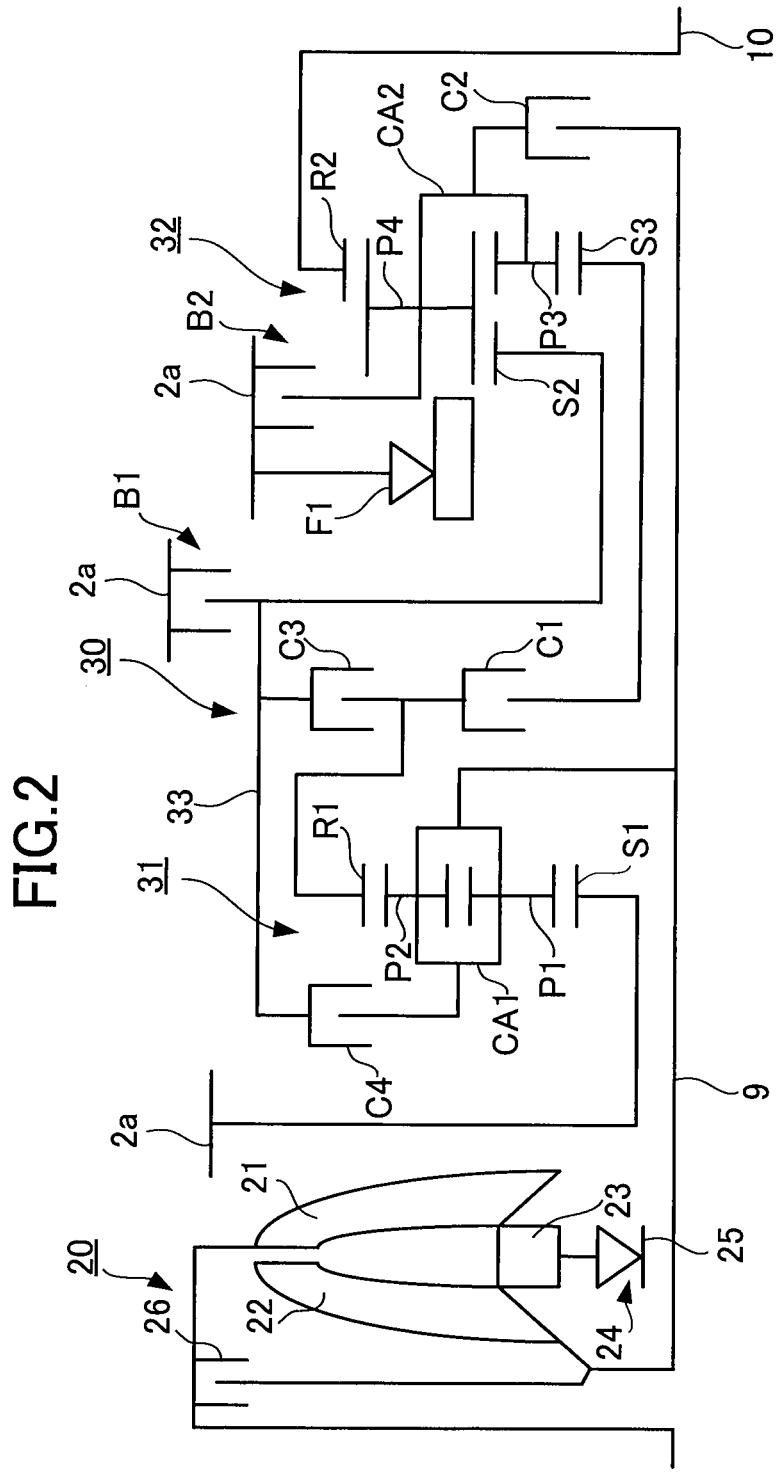
FIG. 2 is a skeleton view of an automatic transmission according to the first embodiment of the present invention.

FIG. 2 is a skeleton view showing the automatic transmission according to the first embodiment of the present invention. As shown in FIG. 2, the torque converter 20 is drivably connected with the engine 1 (see FIG. 1), and comprises a pump impeller 21, a turbine runner 22, a stator 23, a one-way clutch 24, a stator shaft 25, and a lock-up clutch 26.

The one-way clutch 24 serves to allow the stator 23 to rotate in only one direction with respect to a case 2a forming part of the automatic transmission 2 of the speed change mechanism portion 30. The stator shaft 25 functions to secure an inner lace forming part of the one-way clutch 24 with the case 2a of the automatic transmission 2.

The lock-up clutch 26 is designed to be capable of directly connecting the pump impeller 21 with the turbine runner 22 of the torque converter 20, and can assume an engagement state in which the pump impeller 21 (input side) is directly connected with the turbine runner 22 (output side), a disengagement state in which the pump impeller 21 is disengaged from the turbine runner 22, and a half engagement state between the engagement state and the disengagement state, in response to the cruising conditions.

Figure 3:
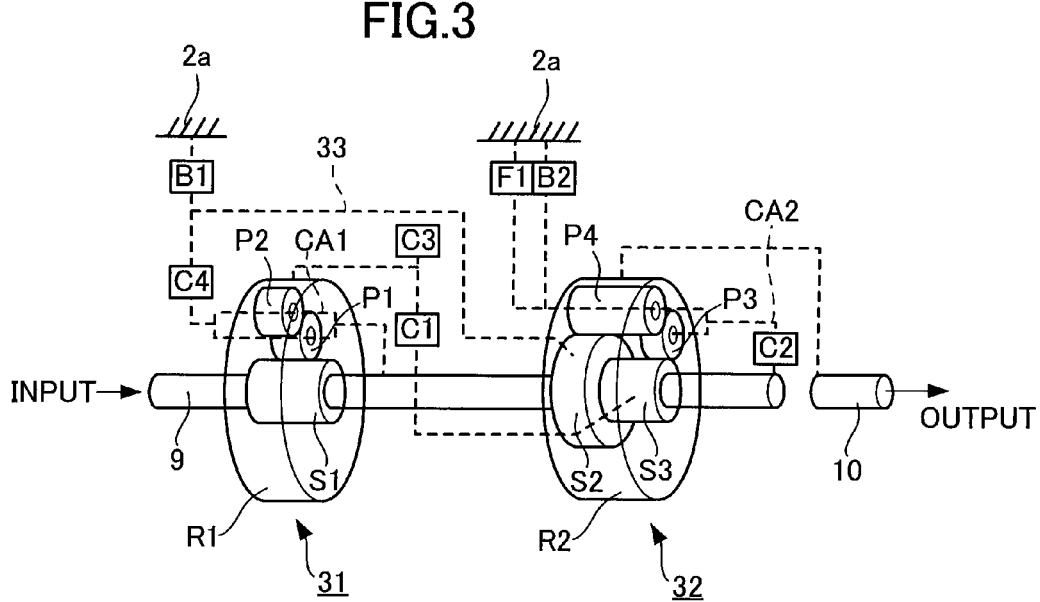
FIG. 3 is a perspective view schematically showing a speed change mechanism portion forming part of the automatic transmission according to the first embodiment of the present invention.

FIG. 3 is a perspective view schematically showing the speed change mechanism portion of the automatic transmission according to the first embodiment of the present invention. As shown in FIGS. 2 and 3, the speed change mechanism portion 30 comprises a front planetary 31, a rear planetary 32, an intermediate drum 33, first to fourth clutches C1 to C4, and first and second brakes B1 and B2. Here, the first and fourth clutches C1 to C4, and the first and second brakes B1 and B2 constitute as a whole a friction engagement element.

The front planetary 31 is constituted by a gear type of planetary mechanism which is called a double pinion type, and comprises a first sun gear S1, a first ring gear R1, a plurality of inner pinion gears P1, a plurality of outer pinion gears P2, and a first carrier CA1.

The first sun gear S1 is secured to the case 2a of the automatic transmission 2 and thus is not rotatable with respect to the case 2a of the automatic transmission 2. The first ring gear R1 is supported by the intermediate drum 33 through the third clutch C3 to assume an integral rotation state having the first ring gear R1 integrally rotate with the intermediate drum 33, and a relative rotation state having the first ring gear R1 relatively rotate with the intermediate drum 33. The first sun gear S1 is concentrically received in the first ring gear R1.

The inner pinion gears P1 and outer pinion gears P2 are circumferentially equi-distantly disposed between the first sun gear S1 and the first ring gear R1, where the first sun gear S1 and the first ring gear R1 are in opposing relationship with each other. The inner pinion gears P1 are held in mesh with the first gear S1, while the outer pinion gears P2 are held in mesh with the inner pinion gears P2 and the first ring gear R1.

The first carrier CA1 is adapted to rotatably support both of the inner pinion gears P1 and the outer pinion gears P2 and has a center shaft portion securely connected with the input shaft 9. The first carrier CA1 has support shaft portions to respectively support the inner pinion gears P1 and the outer pinion gears P2. The support shaft portions are supported by the intermediate drum 33 to assume an integral rotation state having the first carrier CA1 integrally rotate with the intermediate drum 33, and a relative rotation state having the first carrier CA1 relatively rotate with the intermediate drum 33.

The intermediate drum 33 is rotatably disposed radially outwardly of the first ring gear R1, and supported by the case 2a of the automatic transmission 2 through the first brake B1 to assume a non-rotatable state where the intermediate drum 33 is securely connected with the case 2a, and a rotatable state where the intermediate drum 33 is relatively rotatable with respect to the case 2a.

The rear planetary 32 is constituted by a gear type of planetary mechanism which is called a Ravigneaux type. The rear planetary 32 comprises a second sun gear S2 having a large diameter, a third sun gear S3 having a small diameter, a second ring gear R2, a plurality of short pinion gears P3, a plurality of long pinion gears P4, and a second carrier CA2.

The second sun gear S2 is secured to the intermediate drum 33. The third sun gear S3 is connected with the first ring gear R1 of the front planetary 31 through the first clutch C1 to assume an integral rotation state where the third sun gear S3 is rotated integrally with the first ring gear R1, and a relative rotation state where the third sun gear S3 is rotated relatively with the first ring gear R1. The second ring gear R2 is securely connected with the output shaft 10.

The short pinion gears P3 are held in mesh with the third sun gear S3, while the long pinion gears P4 are held in mesh with the second sun gear S2 and the second ring gear R2. Further, the long pinion gears P4 are held in mesh with the third sun gear S3 through the short pinion gear P3.

The second carrier CA2 is adapted to rotatably support the short pinion gears P3 and the long pinion gears P4, and has a center shaft portion connected with the input shaft 9 through the second clutch C2. The second carrier CA2 has support shaft portions to respectively support the short pinion gears P3 and the long pinion gears P4. The support shaft portions are supported by the case 2a of the automatic transmission 2 through the second brake B2 and the one-way clutch F1.

The first to fourth clutches C1 to C4, and the first and second brakes B1 and B2 are each constituted by a wet and multiple disc type friction engagement device using the oil viscosity.

The first clutch C1 is adapted to assume an engagement state having the third sun gear S3 of the rear planetary 32 and the first ring gear R1 of the front planetary 31 integrally rotated, and a disengagement state having the third sun gear S3 of the rear planetary 32 and the first ring gear R1 of the front planetary 31 relatively rotated with each other.

The second clutch C2 is adapted to assume an engagement state having the second carrier CA2 of the rear planetary 32 and the input shaft 9 integrally rotated, and a disengagement state having the second carrier CA2 of the rear planetary 32 and the input shaft 9 relatively rotated with each other.

The third clutch C3 is adapted to assume an engagement state having the first ring gear R1 of the front planetary 31 and the intermediate drum 33 integrally rotated, and a disengagement state having the first ring gear R1 of the front planetary 31 and the intermediate drum 33 relatively rotated with each other.

The fourth clutch C4 is adapted to assume an engagement state having the first carrier CA1 of the front planetary 31 and the intermediate drum 33 integrally rotated, and a disengagement state having the first carrier CA1 of the front planetary 31 and the intermediate drum 33 relatively rotated with each other.

The first brake B1 is adapted to assume an engagement state in which the intermediate drum 33 is coupled with and thus not rotated with respect to the case 2a of the automatic transmission 2, and a disengagement state having the intermediate drum 33 and the case 2a of the automatic transmission 2 relatively rotated with each other.

The second brake B2 is adapted to assume an engagement state in which the second carrier CA2 of the rear planetary 32 is coupled with and thus not rotated with respect to the case 2a of the automatic transmission 2, and a disengagement state having the second carrier CA2 of the rear planetary 32 and the case 2a of the automatic transmission 2 relatively rotated with each other.

The one-way clutch F1 serves to allow the second carrier CA2 of the rear planetary 32 to be rotated in only one direction.

Figure 4:
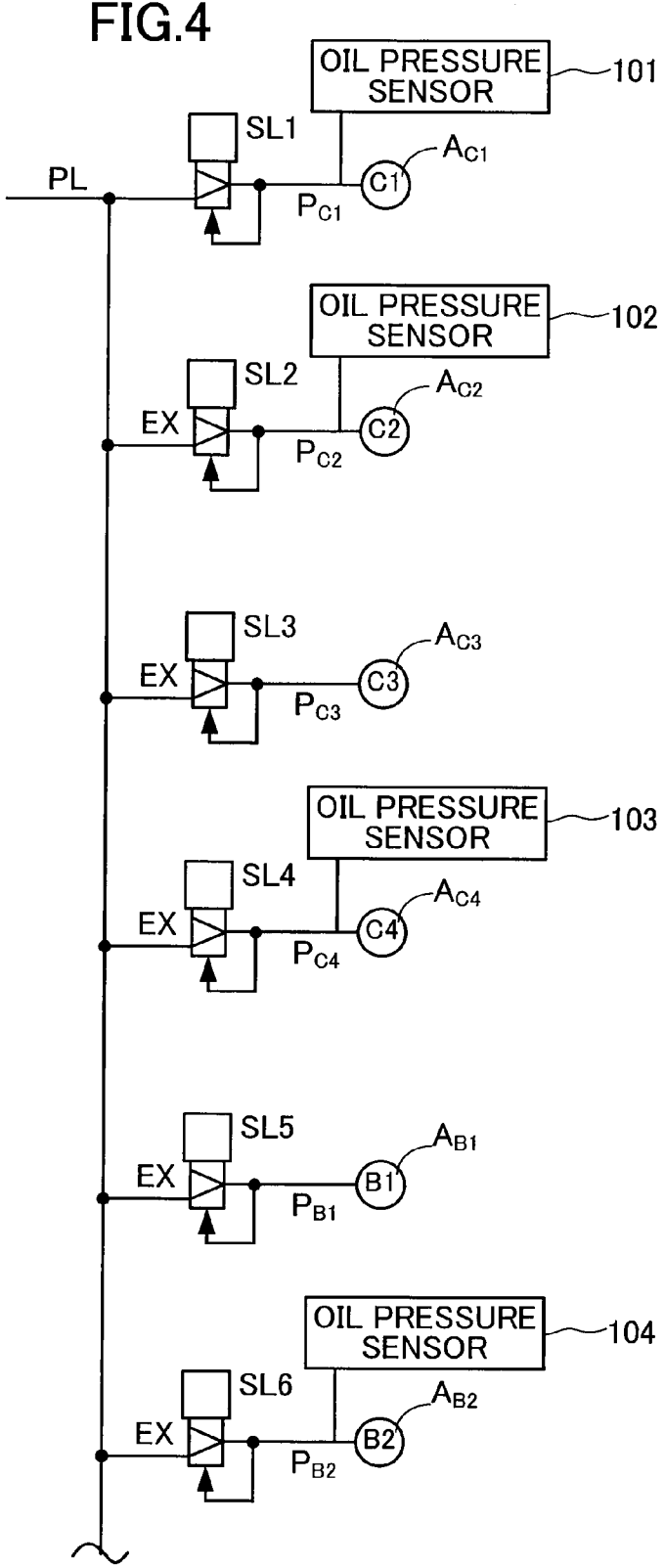
FIG. 4 is a circuit diagram of an oil pressure control apparatus forming part of the automatic transmission according to the first embodiment of the present invention.

FIG. 4 is a circuit diagram showing the oil pressure control apparatus forming part of the automatic transmission according to the first embodiment of the present invention. As shown in FIG. 4, the oil pressure control apparatus 40 comprises linear solenoid valves SL1 to SL6, and an oil pressure control circuit so that the oil pressure control apparatus 40 can control the speed change mechanism portion 30 (see FIG. 1). More specifically, the oil pressure control apparatus 40 is designed to operate and control the linear solenoid valves SL1 to SL6 and other solenoid valves not shown in response to the operation of a shift lever apparatus hereinafter appearing so that the oil pressures for changing the operation states of the friction engagement elements and the parking lock mechanism can be controlled. The oil pressure control circuit has oil pressure actuators (oil pressure cylinders) AC1, AC2, AC3 and AC4 for selectively changing the engagement state and the disengagement state of the respective first to fourth clutches C1 to C4, and oil pressure actuators (oil pressure cylinders) AB1 and AB2 for selectively changing the engagement state and the disengagement state of the respective first and second brakes B1 and B2. The oil pressure control circuit further has an oil pressure actuator (oil pressure cylinder) not shown in the drawings for selectively changing operation states changeable between a lock state having a parking pole held in mesh with a parking gear, and an unlock state having the parking pole not held in mesh with the parking gear.

The operations of the oil pressure actuators (oil pressure cylinders) AC1, AC2, AC3, AC4, AB1 and AB2 are respectively controlled by the linear solenoid valves SL1 to SL6 and other solenoid valves not shown in the drawings.

The line oil pressure PL is regulated by the linear solenoid valves SL1 to SL6 so that engagement oil pressures PC1, PC2, PC3, PC4, PB1 and PB2 are supplied to the respective oil pressure actuators AC1, AC2, AC3, AC4, AB1 and AB2 in response to command signals from the T-ECU 4. The line oil pressure PL is directly supplied to the oil pressure actuators AC1, AC2, AC3, AC4, AB1 and AB2 after being generated by a mechanically operated type of oil pump 60 (see FIG. 1) driven by the engine 1.

The linear solenoid valves SL1 to SL6 basically have the same constructions with each other, and designed to independently be exited or not-exited by the T-ECU 4. The oil pressures supplied to the oil pressure actuators AC1, AC2, AC3, AC4, AB1 and AB2 are regulated independently with the excitation and no-excitation of the respective linear solenoid valves SL1 to SL6. The regulation control of the oil pressure actuators AC1, AC2, AC3, AC4, AB1 and AB2 enables the control of the engagement pressure PC1, PC2, PC3, PC4, PB 1 and PB2 respectively supplied to the first to fourth clutches and the first and second brakes B1 and B2. The speed change mechanism portion 30 is designed to establish the speed change stages with the predetermined friction engagement elements being engaged in line with an operation table which will become apparent as the description proceeds.

The oil pressures supplied to the oil pressure actuators AC1, AC2, AC4 and AB2 are respectively detected by oil pressure sensors 101 to 104. The oil pressure sensors 101 to 104 each are designed to output either one of ON signal indicating that the corresponding friction engagement elements are in engagement state, or OFF signal indicating that the corresponding friction engagement elements are in disengagement state, based on the comparison of the detected oil pressure with the predetermined threshold level.

In this embodiment, the threshold level is set such that the output signal output from the oil pressure sensors 101 to 104 each tends to be changed in the changing state faster from ON state signal to OFF state signal than from OFF state signal to ON state signal. The oil pressure sensors 101 to 104 are designed to detect the oil pressures supplied to the oil pressure actuators AC1, AC2, AC4 and AB2. However, this constitution is merely exemplary, and not limited to this constitution.

Figure 5:
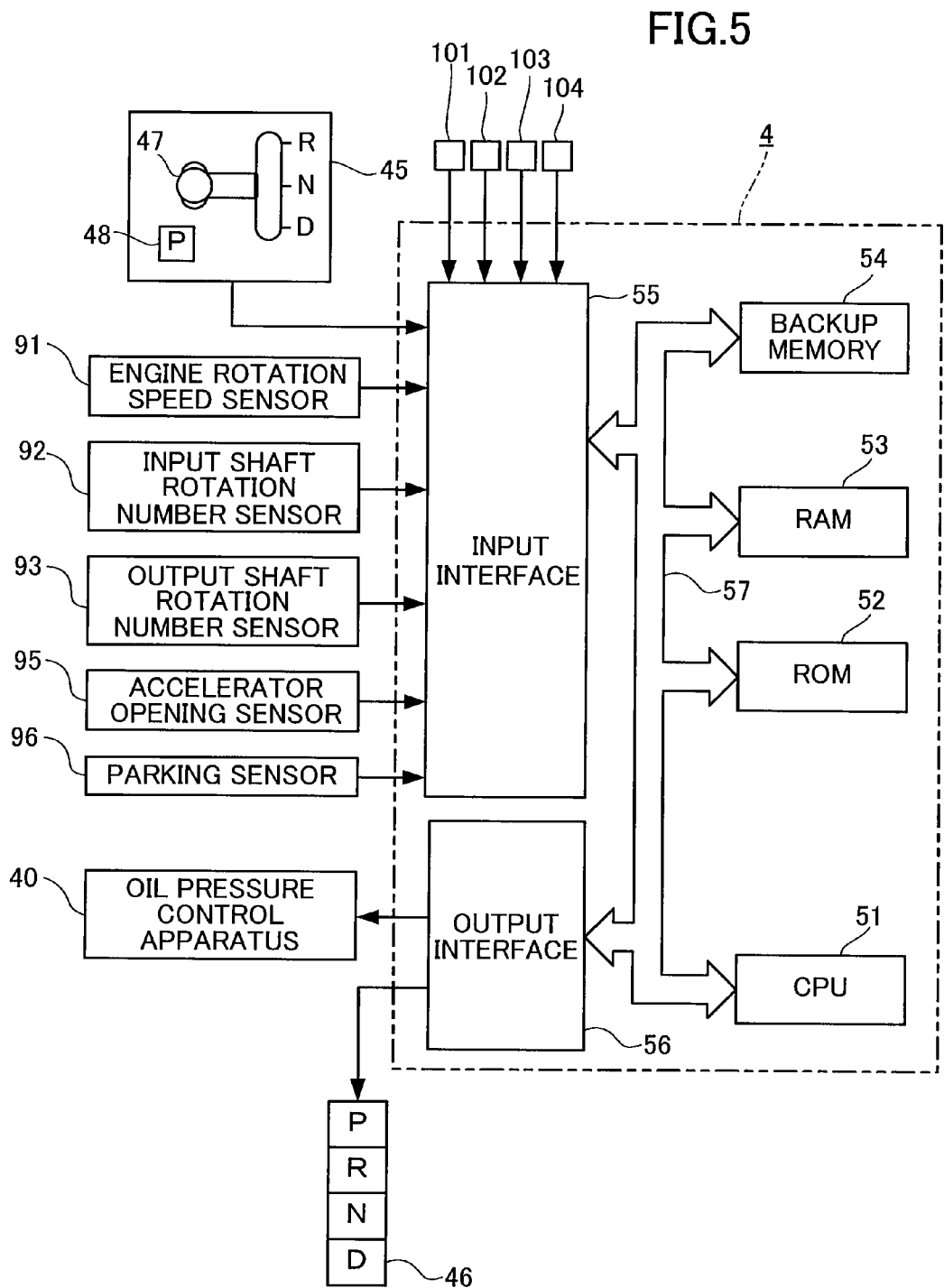
FIG. 5 is a block diagram of a transmission control apparatus according to the first embodiment of the present invention.

FIG. 5 is a block diagram of a transmission control apparatus according to the first embodiment of the present invention. As shown in FIG. 5, the T-ECU 4 comprises a central processing unit (CPU) 51, a read only memory (ROM) 52, a random access memory (RAM) 53, a backup memory 54, an input interface 55, an output interface 56, which are mutually connected by a bidirectional bus 57.

The CPU 51 is adapted to perform operation processes in accordance with a variety of control programs and control maps stored in the ROM 52. The ROM 52 stores a variety of control programs for controlling the speed change operation of the speed change mechanism portion 30. The ROM 52 further stores programs to realize the process hereinafter appearing, a map indicative of "speed change lines" defined by a vehicle speed and an accelerator opening, and gear ratios of the respective speed change stages used to judge if the speed change is finished or not. The RAM 53 is adapted to temporary store operation results of the CPU 51, and data input from a variety of sensors. The backup memory 54 is constituted by a non volatile memory for storing a variety of data to be saved.

The input interface 55 is connected with a variety of sensors such as an engine rotation speed sensor 91, an input shaft rotation number sensor 92, an output shaft rotation number sensor 93, an accelerator opening sensor 95, a parking sensor 96, and the oil pressure sensors 101 to 104. The output interface 56 is connected with the linear solenoid valves (SL1 to SL6) and other solenoid valves forming part of the oil pressure control apparatus 40.

The engine rotation speed sensor 91 is designed to detect a rotation speed of the pump impeller 21 as an engine rotation speed, where the pump impeller 21 partly forms the torque converter 20 and the rotation of the engine 1 is transmitted thereto. The input shaft rotation number sensor 92 is designed to detect a rotation number of the input shaft 9, while the output shaft rotation number sensor 93 is designed to detect a rotation number of the output shaft 10.

The accelerator opening sensor 95 is designed to detect an accelerator pedal stroke. The parking sensor 96 is located in a piston cylinder forming part of a parking lock mechanism, and designed to detect whether the parking lock mechanism is in a lock state in which a parking pole is being mesh with a parking gear. The parking sensor 96 is adapted to output an ON state signal when the parking lock mechanism is in the lock state, and an OFF state signal when the parking lock mechanism is in an unlock state.

The oil pressure sensors 101 to 104 are designed to detect oil pressures supplied to the respective friction engagement elements controlled by the T-ECU 4 and the oil pressure control apparatus 40. The T-ECU 4 is operative to control the linear solenoid valves SL1 to SL6 and other solenoid valves based on the detection results of these sensors.

The T-ECU 4 is connected through the input interface 55 to a shift lever apparatus 45 for selecting the shift range. The T-ECU 4 is adapted to control the oil pressure control apparatus 40 to have the shift range changed based on the selection signal outputted by the shift lever apparatus 45. The T-ECU 4 is connected to a shift display device 46 to indicate the selected shift range, and adapted to change the indication on the shift display device 46 based on the selected shift range.

The shift lever apparatus 45 comprises a shift lever 47 and a parking button 48. The shift lever apparatus 45 is designed to select a reverse (R) range, a neutral (N) range, a drive (D) range, that is, a D-range in response to the operation of the shift lever 47. The shift lever apparatus 45 is also designed to select a parking (P) range when the parking button 48 is pressed down. The shift lever apparatus 45 has a plurality of sensors positioned at the respective shift positions of the shift lever 47. This makes it possible for the shift lever apparatus 45 to output to the T-ECU 4 the selection signal in response to the shift range selected by the operation of the shift lever 47.

The T-ECU 4 is adapted to control the oil pressure control apparatus 40 to have the shift range changed when the shift lever 47 is retained, for a predetermined period of time, at one of the shift positions respectively corresponding to the shift range. For example, the T-ECU 4 is adapted to perform the speed change operation based on the aforementioned speed change lines when the shift lever 47 is shifted to the position corresponding to the D-range.

As aforementioned, the oil pressure control apparatus 40 is designed to regulate the line oil pressure in response to the shift range, and supplied to the friction engagement elements by regulating the line oil pressure in response to the speed change stages.

In this embodiment, the shift lever apparatus 45 and the shift display device 46 is directly connected to the T-ECU 4. However, the shift lever apparatus 45 and the shift display device 46 may be connected with the T-ECU 4 through a shift-by-wire ECU. Additionally, the shift lever apparatus 45 according to this embodiment may have not only the automatic speed change mode but also a manual speed change mode to be selected, though the explanation will be omitted.

The conditions to establish the respective speed change stages by the speed change mechanism portion 30 will be explained with reference to FIGS. 6 and 7.

FIG. 6 is an engagement table showing the operation states of the first to fourth clutches C1 to C4, the first and second brakes B1 and B2, and the one-way clutch F1 in response to the respective speed change stages. In this engagement table, the circle marks represent the engagement state, the cross marks represent the disengagement state, the double circle marks represent that the engagement state is taken when an engine brake is functioning, and the triangular marks represent that the engagement state is taken only when the driving power is generated.

Figure 7:
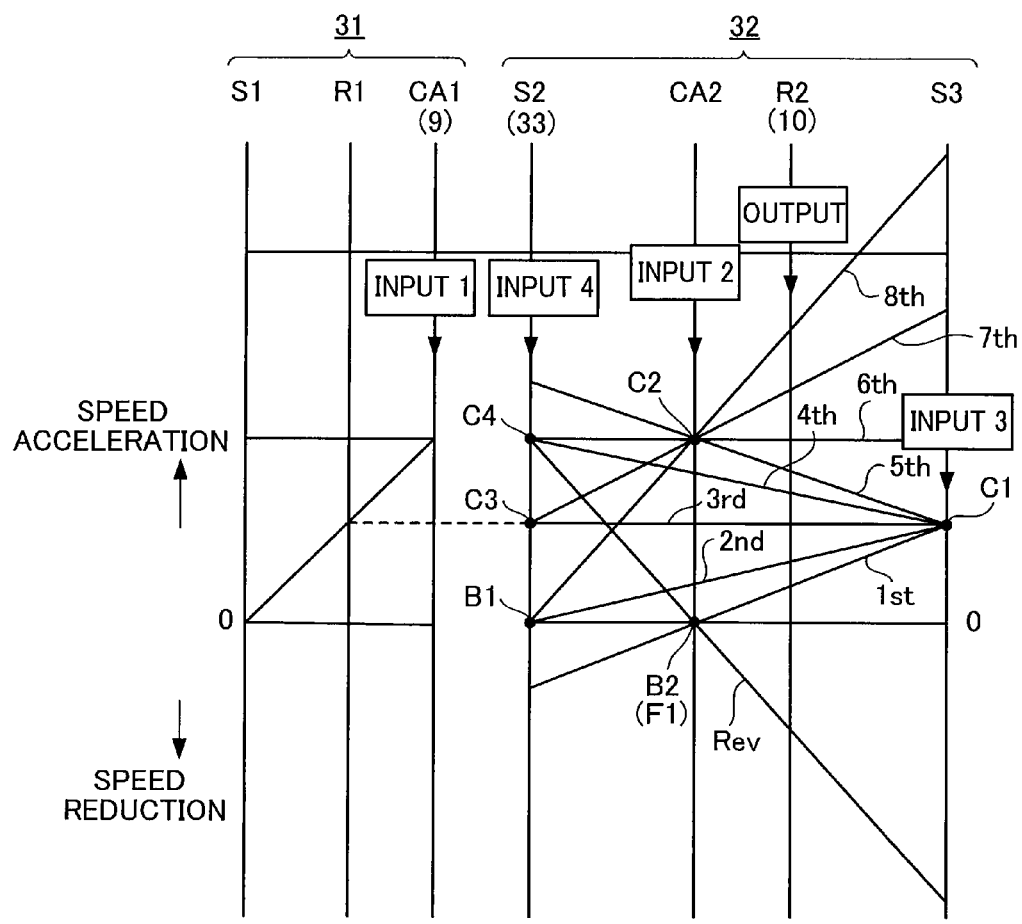
FIG. 7 is a speed diagram showing rotation number ratio of constitution elements respectively forming planetary gears at every speed change stage according to the first embodiment of the present invention.

FIG. 7 is a speed diagram showing rotation number ratio of constitution elements forming the front planetary 31 and the rear planetary 32 at every speed change stages (1st to 8th of the forward speed change stages and rearward movement speed change stage) established by selectively engaging the first to fourth clutches C1 to C4, the first and second brakes B1 and B2, and the one-way clutch F1.

In FIG. 7, each longitudinal axis represents the velocity ratio of constitution elements forming the front planetary 31 and the rear planetary 32. The longitudinal axes are positioned to have predetermined gaps therebetween so that the gaps are set in response to the gear ratio of the constitution elements. In addition, the indications "C1" to "C4", "B1", "B2", and "F1" represent respective positions where the first to fourth clutches C1 to C4, the first and second brakes B1 and B2, and the one-way clutch F1 are engaged.

Furthermore, the indications "input 1" to "input 4" in FIG. 7 represent the input position of the rotation power from the input shaft 9, while the indication "output" represents the output position of the rotation power to be outputted to the output shaft 10.

FIG. 9A is a view showing operation patterns 100 of the friction engagement elements respectively indicative of the operation states of the friction engagement elements detected by the oil pressure sensors and the parking sensors. FIG. 9B is a view explaining the operation states of the friction engagement elements in the changing states from the 4-speed stage to the 6-speed stage among the operation states of the friction engagement elements detected by the oil pressure sensors and the parking sensors.

The T-ECU 4 is adapted to determine a current shift range of the automatic transmission based on the operation patterns 100 shown in FIG. 9A according to this embodiment. The operation patterns 100 are determined by the operation states of the first clutch C1, the second clutch C2, the fourth clutch C4, and the second brake B2, which are the same as the part of the engagement table shown in FIG. 6, and by the operation state of the parking sensor. The ROM 52 of the T-ECU 4 is adapted to store a map indicative of the operation patterns 100. The T-ECU 4 therefore constitutes memory means. The view of FIG. 9B will be described in detail hereinafter, but the circle marks represent the engagement state of the friction engagement elements, while the cross marks represent the disengagement state of the friction engagement elements. The circle marks also represent that the parking sensor outputs the ON state signal, while the cross marks also represents that the parking sensor outputs the OFF state signal.

The further characteristic constitution of the T-ECU 4 according to the first embodiment of the present invention will be described hereinafter.

The T-ECU 4 is adapted to determine whether the automotive vehicle is cruising in the D-range based on the operation states of the friction engagement elements. More specifically, the T-ECU 4 is adapted to determine whether the automotive vehicle is cruising in the D-range based on the operation patterns 100 and the oil pressure detection results detected by the oil pressure sensors 101 to 104. The T-ECU 4 is also adapted to determine that the automotive vehicle is cruising in the D-range when the D-range is held without based on the operation states of the friction engagement elements in the changing states, as will be apparent as the description proceeds.

The T-ECU 4 is adapted to control the oil pressure utilized for changing the operation states of the respective friction engagement elements. More specifically, the T-ECU 4 is adapted to control the oil pressure control apparatus 40 to have the states of the linear solenoid valves SL1 to SL6 operated in order to control the oil pressure utilized for changing the operation states of the respective clutches and brakes. Therefore, the oil pressure control apparatus 40 and the T-ECU 4 collectively constitute oil pressure control means.

The oil pressure sensors 101 to 104 are positioned at the respective first clutch C1, the second clutch C2, the fourth clutch C4 and the second brake B2, and the T-ECU 4 is designed to determine the operation states of the first clutch C1, the second clutch C2, the fourth clutch C4 and the second brake B2 by receiving the oil pressure detection results from the oil pressure sensors 101 to 104. More specifically, the T-ECU 4 is adapted to determine whether the friction engagement elements each are in the engagement state or in the disengagement state base on the oil pressure detection results by receiving signals indicative of ON state or OFF state outputted from the oil pressure sensors 101 to 104. The T-ECU 4 and the oil pressure sensors 101 to 104 therefore collectively constitute a plurality of oil pressure detection means.

The T-ECU 4 is adapted to determine whether the automatic transmission 2 is in the speed change state where the operation states of the friction engagement elements are changing, or not. More specifically, the T-ECU 4 is adapted to determine that the speed change state is started at the timing when control signals are sent to the linear solenoid valves SL1 to SL6 and other solenoid valves not shown based on the speed change lines. Additionally, the T-ECU 4 is adapted to determine whether the speed change state is finished or not based on the detection result of the input shaft rotation number sensor 92 and the output shaft rotation number sensor 93, and a gear ratio of the speed change stage corresponding to the control signals. This means that the T-ECU 4 is adapted to determine that the automatic transmission 2 is in the speed change state from the timing when the T-ECU 4 determines that speed change state is started to the timing when T-ECU 4 determines that the speed change state is finished. Therefore, the T-ECU 4 constitutes speed change determination means.

The T-ECU 4 is adapted to determine the real shift range based on the operation states of the clutches and brakes. In other words, the T-ECU 4 determines the current shift range based on the oil pressure detection results detected by the oil pressure sensors 101 to 104, and the operation patterns 100 stored in the ROM 52 while not in the speed change state. More specifically, the T-ECU 4 is adapted to determine the current shift range based on the operation patterns 100 excluding the time period from when the control signals for starting the speed change state are sent until when the speed change state is finished. Additionally, the detection result detected prior to the speed change state is started is determined as the current shift range by the T-ECU 4 in the speed change state. In this case, the T-ECU 4 is adapted to hold the previous value indicative of the detection result detected before the speed change state is started. The T-ECU 4 therefore constitutes shift range determination means.

The following description will be directed to the operation of the range determination apparatus. FIG. 8 is a flow chart showing the operation of the T-ECU 4 according to the first embodiment of the present invention. The following process is realized by the programs stored in the ROM 52, and executed by the CUP 51 with a predetermined time interval.

Firstly, the T-ECU 4 determines whether the automotive vehicle is cruising in the D-range or not (Step S1) as shown in FIG. 8. More specifically, the T-ECU 4 judges that the automotive vehicle is cruising in the D-range in case the T-ECU 4 determines, based on the operation patterns 100 and the oil pressure detection results detected by the oil pressure sensors 101 to 104 in the following step, that the D-range is established, and in case that the T-ECU 4 determines that the D-range is held in the following step in the speed change state.

Next, the T-ECU 4 judges whether the automatic transmission 2 is in the speed change state or not (Step S2). More specifically, the T-ECU 4 judges whether the process is in the time period from the timing when the control signals for starting the speed change state are sent until the timing when the speed change state is finished.

Next, the T-ECU 4 holds the determination result obtained just before the speed change state is started in case the T-ECU 4 judges that the automatic transmission 2 is in the speed change state in the step S2 (Step S3). More specifically, the detection result detected before the speed change state is started is determined as the current shift range during the speed change state, and the previous value indicative of the detection result detected before the speed change state is started is held by the T-ECU 4.

Additionally, the T-ECU 4 determines the current shift range based on the operation patterns 100 while not in the speed change state in the step S2 (Step S4). In this case, the T-ECU 4 determines the current shift range based on the operation patterns 100 and the oil pressure detection results detected by the oil pressure sensors 101 to 104 while not in the speed change state.

The operation states of the friction engagement elements during the speed change state from the 4-speed stage to the 6-speed stage will be explained with reference to FIG. 9B.

The operation states of the friction engagement elements and the parking sensor in the speed change state of the automatic transmission from the 4-speed stage to the 6-speed stage are shown in FIG. 9B.

As shown in FIG. 9B, the first clutch C1 is changed into the disengagement state while the second clutch C2 is changed into the engagement state in the changing states from the 4-speed stage to the 6-speed stage; however, there is a timing that both of the first clutch C1 and the second clutch C2 are in the disengagement state in the transient period, that is, in the speed change state. In this case, none of the operation patterns 100 are coincident with this situation that only the fourth clutch C4 is in the engagement state. The range determination apparatus according to this embodiment, therefore, holds the determination result indicative of the D-range obtained before the speed change state is started while in the speed change state, without executing the determination by utilizing the operation patterns 100 shown in FIG. 9A.

The oil pressure sensors 101 to 104 tend to change the output signal faster when changing from ON state signal to OFF state signal than changing from OFF state signal to ON state signal in the speed change state, due to the threshold levels set for the respective oil pressure sensors 101 to 104. This results in the fact that only the fourth clutch C4 is in the engagement state in the speed change state. Meanwhile, the first clutch C1, the second clutch C2, and the fourth clutch C4 are in the engagement state in case the threshold levels are set so that the oil pressure sensors 101 to 104 tend to change the output signal slower when changing from ON state signal to OFF state signal than changing from OFF state signal to ON state signal in the speed change state from the 5-speed stage to the 6-speed stage. In this case, none of the operation patterns 100 are coincident with the states of the friction engagement elements.

Though the explanation about speed change states from the 4-speed stage to the 6-speed stage and from the 5-speed stage to the 6-speed stage is provided, this is merely an example and not limited thereto. This means that the shift range is prevented from becoming undefined even when the detection results obtained from the oil pressure sensors 101 to 104 do not coincide with the operation patterns 100, due to the fact that the determination result indicative of the D-range is held in the speed change state.

As will be understood from the foregoing description, the range determination apparatus according to this embodiment can precisely determine the current shift range due to the fact that the current shift range is determined based on the operation patterns 100 and the oil pressure detection results detected by the oil pressure sensors 101 to 104 when the automatic transmission is determined as not being in a speed change state. Additionally, the range determination apparatus can prevent the shift range from becoming undefined even when the oil pressure detection results do not coincide with the operation patterns 100, due to the fact that the shift range is determined without based on the operation patterns 100 when the automatic transmission is determined as being in the speed change state. Therefore, the range determination apparatus can prevent the shift range from becoming undefined in the speed change state even for an automatic transmission with no manual valve.

In addition, the range determination apparatus can prevent the shift range from becoming undefined resulting from the fact that the range determination apparatus can determine the current shift range, by using the determination results obtained before the operation states of the friction engagement elements are changed in the speed change state, that is, the determination results obtained before entering the speed change state, under the condition that the automatic transmission 2 is in the speed change state without executing the shift change, that is, the speed change state in the D-range.

The range determination apparatus, therefore, can prevent the automatic transmission from being judged as having failure, and prevent information indicative of the automatic transmission as having failure from being displayed on a display and so on, due to the fact that the shift range is not determined as undefined.

Though there has been described about the fact that the range determination apparatus holds the determination result indicative of the D-range during the speed change state, the range determination apparatus may determine the shift range based on the operation patterns 100 in case that either one of the operation patterns 100 is coincident with the states of the friction engagement elements, which will be described hereinafter as the second embodiment.

Second Embodiment

The T-ECU forming part of the range determination apparatus according to the second embodiment will be described hereinafter.

The constitutional elements of the range determination apparatus including the T-ECU according to the second embodiment are the same as those of the first embodiment in most part. Therefore, the constitutional elements of the second embodiment the same as those of the first embodiment will not be described but bear the same reference numerals and legends as those of the first embodiment.

The T-ECU 4 is adapted to determine whether or not the oil pressure detection results obtained by the oil pressure sensors 101 to 104 are coincident with either one of the operation patterns 100 stored in the ROM 52. The T-ECU 4 therefore constitutes match determination means.

The T-ECU 4 is adapted to determine the current shift range based on the operation patterns 100 and the oil pressure detection results detected by the oil pressure sensors 101 to 104 under the condition that the T-ECU 4 determines that the oil pressure detection results match either one of the operation patterns 100 stored in the ROM 52. In addition, the T-ECU 4 is adapted to determine the determination results obtained prior to the speed change state as the current shift range under the condition that the T-ECU 4 determines that the oil pressure detection results do not match either one of the operation patterns 100 stored in the ROM 52.

The following description will be directed to the operation of the range determination apparatus. FIG. 10 is a flow chart showing the operation of the T-ECU 4 according to the second embodiment of the present invention. The following process is realized by the programs stored in the ROM 52, and executed by the CPU 51 with a predetermined time interval.

Firstly, the T-ECU 4 determines whether the automotive vehicle is cruising in the D-range or not (Step S11) as shown in FIG. 10. More specifically, the T-ECU 4 determines that the automotive vehicle is cruising in the D-range in case the T-ECU 4 judges that the D-range is established based on the operation patterns 100 and the oil pressure detection results detected by the oil pressure sensors 101 to 104 in the following step, and in case the T-ECU 4 judges that the D-range is held during the speed change state in the following step.

Next, the T-ECU 4 judges whether the automatic transmission 2 is in the speed change state or not (Step S12). More specifically, the T-ECU 4 judges whether the process is in the time period from the timing when the control signals for starting the speed change state are sent until the timing when the speed change state is finished.

In case the T-ECU 4 determines that the automatic transmission 2 is in the speed change state, the T-ECU 4 then determines whether or not the oil pressure detection results obtained by the oil pressure sensors 101 to 104 match either one of the operation patterns 100 stored in the ROM 52 (Step S13).

In case the T-ECU 4 determines that the oil pressure detection results do not match either one of the operation patterns 100 in step S13, the T-ECU 4 holds the shift range determined before the speed change state is started (Step S14). Additionally, the T-ECU 4 determines the current shift range based on the operation patterns 100 under the condition that the T-ECU 4 determines that the oil pressure detection results match either one of the operation patterns 100 (Step S15).

As will be understood from the foregoing description, the range determination apparatus according to this embodiment can determine the current shift range based on the operation patterns 100 stored in the ROM 52 and the oil pressure detection results detected by the oil pressure sensors 101 to 104 in case the T-ECU 4 determines that the oil pressure detection results detected by the oil pressure sensors 101 to 104 match either one of the operation patterns 100 even in the speed change state. This makes it possible for the range determination apparatus to precisely determine the current shift range even in the speed change state due to the fact that the current shift range is determined based on the operation patterns 100. Meanwhile, the range determination apparatus can prevent the shift range from becoming undefined even when the oil pressure detection results detected by the oil pressure sensors 101 to 104 do not coincide with the operation patterns 100 stored in the ROM 52, due to the fact that the range determination apparatus can determine the determination results obtained prior to speed change state as the current shift range during the speed change state.

There has been described about the fact that the range determination apparatus determines the shift range based on the operation patterns 100 in case either one of the operation patterns 100 is coincident with the detection results of the oil pressure sensors 101 to 104. However, the range determination apparatus may preliminarily memorize the speed change states in which a combination of the operation states may not be coincident with the operation patterns memorized in the ROM 52 when the friction engagement elements are operated to be in the changing state while in the speed change state, and determine the detection result obtained before the speed change state is started as the current shift range when the speed change state is coincident with either one of the preliminarily memorized speed change states, which will be described hereinafter as the third embodiment.

Third Embodiment

The T-ECU forming part of the range determination apparatus according to the third embodiment will be described hereinafter.

The constitutional elements of the range determination apparatus including the T-ECU according to the third embodiment are the same as those of the first embodiment in most part. Therefore, the constitutional elements of the third embodiment the same as those of the first embodiment will not be described but bear the same reference numerals and legends as those of the first embodiment.

The T-ECU 4 is designed to preliminarily memorize the speed change states in which a combination of the operation states may not be coincident with the operation patterns 100 memorized in the ROM 52 when the friction engagement elements are operated to be in the changing state. The T-ECU 4 is also designed to determine whether or not the current speed change state is coincident with the preliminarily memorized speed change states in which the combination of the operation states may not be coincident with the operation patterns 100 memorized in the ROM 52 in the speed change state. Therefore, the T-ECU 4 constitutes speed change determination means.

The T-ECU 4 is designed to determine whether the speed change state is accompanied with a gripping change of the first clutch C1 and the second clutch C2 in case the T-ECU 4 judges that the automatic transmission 2 is in the speed change state, which means that one of the first and the second clutches C1 and C2 is changed from the engagement state into the disengagement state while the other is changed from the disengagement state into the engagement state. For example, the T-ECU 4 determines whether the speed change state is accompanied with the gripping change of the first clutch C1 and the second clutch C2, that is, whether the speed change state is from the 4-speed stage to the 6-speed stage, or from the 6-speed stage to the 4-speed stage.

As can be understood from the operation patterns 100 shown in FIG. 9A, at least one of the first and the second clutches C1 and C2 is in the engagement state in the D-range. However, both of the first and the second clutches C1 and C2 can be simultaneously in the disengagement state in the speed change state in case that the gripping change occurs, due to the fact that the oil pressure sensors 101 to 104 each tend to change the output signal faster when changing from ON state signal to OFF state signal than changing from OFF state signal to ON state signal in the changing state as aforementioned. This leads to the fact that the oil pressure detection results do not match with the operation patterns 100. The T-ECU 4 therefore preliminarily memorizes in the ROM 52 the speed change states in which the shift range is "undefined" in the speed change state, and determines whether the speed change based on the speed change lines is coincident with either one of the speed change states in which the shift range is "undefined".

When the T-ECU 4 determines that the current speed change state is not coincident with the preliminarily memorized speed change states in which the combination of the operation states may not be coincident with the operation patterns 100, the T-ECU 4 is adapted to determine the current shift range based on the operation patterns 100 and the oil pressure detection results detected by the oil pressure sensors 101 to 104. Additionally, the T-ECU 4 is adapted to determine the determination results obtained prior to the speed change state as the current shift range in case the T-ECU 4 determines that the speed change state matches either one of the speed change states which can cause the shift range as "undefined".

In addition, the T-ECU 4 is adapted to determine in the speed change state the current shift range based on the operation patterns 100 and the oil pressure detection results detected by the oil pressure sensors 101 to 104 under the condition that the T-ECU 4 determines that the gripping change does not occur. Furthermore, the T-ECU 4 is adapted to determine in the speed change state the determination results obtained prior to the speed change state as the current shift range, and hold the previous value indicative of the detection result detected before the changing states are started, under the condition that the T-ECU 4 determines that the gripping change occurs.

The following description will be directed to the operation of the range determination apparatus. FIG. 11 is a flow chart showing the operation of the T-ECU 4 according to the third embodiment of the present invention. The process is realized by the programs stored in the ROM 52, and executed by the CPU 51 with a predetermined time interval.

Firstly, the T-ECU 4 determines whether the automotive vehicle is cruising in the D-range or not (Step S21) as shown in FIG. 11. More specifically, the T-ECU 4 determines that the automotive vehicle is cruising in the D-range in case the T-ECU 4 judges that the D-range is established based on the operation patterns 100 and the oil pressure detection results detected by the oil pressure sensors 101 to 104 in the following step, and in case the T-ECU 4 judges that the D-range is held during the speed change state in the following step.

Next, the T-ECU 4 judges whether the automatic transmission 2 is in the speed change state or not (Step S22). More specifically, the T-ECU 4 judges whether the process is in the time period from the timing when the control signals for starting the speed change state are sent until the timing when the speed change state is finished. The T-ECU 4 then determines whether or not the gripping change between the first and the second clutches C1 and C2 occurs, under the condition that the T-ECU 4 determines that the operation states of the friction engagement elements are each being changed in the speed change state (Step S23).

The T-ECU 4 then holds the shift range determined before the speed change state is started in case the T-ECU 4 determines that the gripping change between the first and the second clutches C1 and C2 occurs (Step S24). Additionally, the T-ECU 4 determines the current shift range based on the operation patterns 100 in case the T-ECU 4 determines that the gripping change between the first and the second clutches C1 and C2 does not occur in the speed change state (Step S25).

While the above embodiments have been described with reference to the power train mounted on an automotive vehicle, the constitution of the power train is merely an example, and not limited thereto. Any power train may be utilized as long as the range determination apparatus according to this invention can be applied.

As will be understood from the foregoing description, the range determination apparatus according to this embodiment can prevent the shift range from becoming undefined in the speed change state, resulting from the fact that the range determination apparatus can preliminarily memorize the speed change states in which a combination of the operation states may not be coincident with the operation patterns 100 memorized in the ROM 52, and holds a shift range determined prior to the speed change state in the case that the speed change state is coincident with the memorized speed change state. Additionally, the T-ECU 4 can determine the current shift range based on the operation patterns 100 in case the T-ECU 4 determines that the speed change state is not coincident with the speed change states in which the combination of the operation states may not be coincident with the operation patterns 100. This makes it possible for the range determination apparatus to precisely determine the current shift range even in the speed change states.

From the foregoing description, it will be understood that the present invention can provide the range determination apparatus which can prevent the shift range from becoming undefined in the changing states of the friction engagement elements even for an automatic transmission with no manual valve. The present invention is therefore useful for a range determination apparatus for determining the shift range of the automatic transmission mounted on an automotive vehicle.

1: engine
2: automatic transmission
3: engine control apparatus
4: transmission control apparatus
9: input shaft
10: output shaft
20: torque converter
30: speed change mechanism portion
31: front planetary
32: rear planetary gear
40: oil pressure control apparatus
45: shift lever apparatus
51: CPU
52: ROM
53: RAM
54: backup memory
55: input interface
56: output interface
91: engine rotation speed sensor
92: input shaft rotation number sensor
93: output shaft rotation number sensor
95: accelerator opening sensor
96: parking sensor
100: operating pattern
101-104: oil pressure sensor

The invention claimed is:

1. A range determination apparatus, comprising:
a gear speed change mechanism including a plurality of planetary gears each transmitting an output torque of a drive source and a plurality of friction engagement elements operative to have respective operation states changed to either an engagement state or a disengagement state, the gear speed change mechanism being used with an automatic transmission realizing speed changes with a torque transmission path of the gear speed change mechanism changed by the operation states of the friction engagement elements, and a real shift range determination being performed based on the operation states of the friction engagement elements;
oil pressure control means for controlling oil pressures that change the operation states of the friction engagement elements;
a plurality of oil pressure detection means for detecting the oil pressures controlled by the oil pressure control means;
memory means for storing operation patterns respectively indicative of the operation states of the friction engagement elements;
speed change determination means for determining whether or not the automatic transmission is in a speed change state where the operation states of the friction engagement elements are each being changed by the oil pressure control means; and
shift range determination means for determining a current shift range,
wherein when the automatic transmission is judged by the speed change determination means to not be in the speed change state in which the operation states of the friction engagement elements are each being changed, the shift range determination means determines the current shift range based on the operation patterns stored in the memory means and oil pressure detection results detected by the oil pressure detection means, and
wherein when the automatic transmission is judged by the speed change determination means to be in the speed change state in which the operation states of the friction engagement elements are each being changed, the shift range determination means determines the current shift range to be a drive range obtained prior to the speed change state.

2. The range determination apparatus as defined in claim 1, further comprising:
match determination means for determining whether or not the oil pressure detection results obtained by the oil pressure detection means match one of the operation patterns stored in the memory means when the automatic transmission is judged by the speed change determination means as being in the speed change state in which the operation states of the friction engagement elements are each being changed,
wherein when the oil pressure detection results obtained by the oil pressure detection means are determined to match one of the operation patterns stored in the memory means by the match determination means, the shift range determination means determines the current shift range based on the oil pressure detection results and the operation patterns stored in the memory means, and
wherein when the oil pressure detection results obtained by the oil pressure detection means are determined to not match any of the operation patterns stored in the memory means by the match determination means, the shift range determination means determines the current shift range to be the drive range obtained prior to the speed change state.

3. The range determination apparatus as defined in claim 1, wherein the memory means preliminarily stores the speed change states in which a combination of the operation states do not match the operation patterns stored in the memory, the operation states not matching the operation patterns when the friction engagement elements are operated to have respective operation states changed to either the engagement state or the disengagement state,
wherein the speed change determination means determines whether or not a current speed change state corresponds to the speed change state in which the combination of the operation states do not match the operation patterns stored in the memory,
wherein when the current speed change state is determined by the speed change determination means to not correspond to the speed change state in which a combination of the operation states do not match the operation patterns stored in the memory, the shift range determination means determines the current shift range based on the oil pressure detection results and the operation patterns stored in the memory means, and
wherein when the current speed change state is determined by the speed change determination means to correspond to the speed change state in which a combination of the operation states do not match the operation patterns stored in the memory, the shift range determination means determines the current shift range to be the drive range obtained prior to the speed change state.

4. A range determination apparatus, comprising:
a gear speed change mechanism having a plurality of planetary gears each transmitting an output torque of a drive source and a plurality of friction engagement elements operative to have respective operation states changed to either an engagement state or a disengagement state, the gear speed change mechanism being used with an automatic transmission realizing speed changes with a torque transmission path of the gear speed change mechanism changed by the operation states of the friction engagement elements, and a real shift range determination being performed based on the operation states of the friction engagement elements;

an oil pressure control apparatus that controls oil pressures that change the operation states of the friction engagement elements;

a plurality of oil pressure sensors that detect the oil pressures controlled by the oil pressure control apparatus;

a memory that stores operation patterns respectively indicative of the operation states of the friction engagement elements; and a transmission control apparatus for determining a current shift rang;

wherein when the automatic transmission is in a speed change state where the operation states of the friction engagement elements are each determined as not being changed by the oil pressure control apparatus, the transmission control apparatus determines the current shift range based on oil pressure detection results obtained by the oil pressure sensors and the operation states stored in the memory, and wherein when the automatic transmission is judged as being in the speed change state in which the operation states of the friction engagement elements are each being changed, the transmission control apparatus determines the current shift range to be a drive range obtained prior to the speed change state.

5. The range determination apparatus as defined in claim 4, wherein the transmission control apparatus determines whether or not the oil pressure detection results obtained by the oil pressure sensors match one of the operation patterns stored in the memory when the automatic transmission is judged as being in a speed change state in which the operation states of the friction engagement elements are each being changed by the oil pressure control apparatus, wherein when the oil pressure detection results obtained by the oil pressure sensors are determined by the transmission control apparatus to match one of the operation patterns stored in the memory, the transmission control apparatus determines the current shift range based on the oil pressure detection results obtained by the oil pressure sensors and the operation patterns stored in the memory, and wherein when the oil pressure detection results obtained by the oil pressure sensors are determined by the transmission control apparatus to not match any of the operation patterns stored in the memory, the transmission control apparatus determines the current shift range to be the drive range obtained prior to the speed change state.

6. The range determination apparatus as defined in claim 4, wherein the memory preliminarily stores the speed change states in which a combination of the operation states do not match the operation patterns stored in the memory, the operation states not matching the operation patterns when the friction engagement elements are operated to have respective operation states changed to either the engagement state or the disengagement state in response to the operation states of the friction engagement elements being changed in the speed change state by the oil pressure control apparatus, wherein the transmission control apparatus determines whether or not the oil pressure detection results obtained by the oil pressure sensors correspond to the speed change state in which a combination of the operation states do not match with the operation patterns stored in the memory, wherein when the oil pressure detection results obtained by the oil pressure sensors do not correspond to the speed change state in which a combination of the operation states do not match with the operation patterns stored in the memory, the transmission control apparatus is operative to determine the current shift range based on the oil pressure detection results obtained by the oil pressure sensors and the operation patterns stored in the memory, and wherein when the oil pressure detection results obtained by the oil pressure sensors correspond to the speed change state in which a combination of the operation states do not match the operation patterns stored in the memory, the transmission control apparatus determines the current shift range to be the drive range obtained prior to the speed change state.

\* \* \* \* \*